(12) United States Patent
Saluja et al.

(10) Patent No.: US 12,028,221 B2
(45) Date of Patent: *Jul. 2, 2024

(54) NETWORK ANOMALY DETECTION USING A MULTIVARIATE-RELATIONS ENGINE

(71) Applicant: T-Mobile Innovations LLC, Overland Park, KS (US)

(72) Inventors: Aditi Saluja, Bellevue, WA (US); Raymond Weimin Wu, Bellevue, WA (US); Vikas Ranjan, Bellevue, WA (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/967,673

(22) Filed: Oct. 17, 2022

(65) Prior Publication Data
US 2023/0077217 A1 Mar. 9, 2023

Related U.S. Application Data

(63) Continuation of application No. 17/470,737, filed on Sep. 9, 2021, now Pat. No. 11,477,091.

(51) Int. Cl.
*H04L 41/14* (2022.01)
*H04L 41/06* (2022.01)

(52) U.S. Cl.
CPC .............. *H04L 41/14* (2013.01); *H04L 41/06* (2013.01)

(58) Field of Classification Search
CPC .................. H04L 41/06; H04L 41/14
See application file for complete search history.

(56) References Cited

U.S. PATENT DOCUMENTS

| | | | | |
|---|---|---|---|---|
| 10,489,711 | B1* | 11/2019 | Inbar | H04L 41/142 |
| 2014/0336984 | A1* | 11/2014 | Starr | G05B 23/0297 |
| | | | | 702/183 |
| 2017/0208487 | A1* | 7/2017 | Ratakonda | H04L 43/55 |
| 2019/0356533 | A1* | 11/2019 | Vasseur | G06N 20/10 |

* cited by examiner

*Primary Examiner* — Gil H. Lee
(74) *Attorney, Agent, or Firm* — Shook, Hardy & Bacon L.L.P.

(57) ABSTRACT

In various examples, upon receiving data comprising a plurality of key performance indicators (KPIs), an anomaly may be detected in a first KPI. An engine may apply rules associating two or more KPIs together to confirm, reject, or narrow the anomaly in the first KPI. Through this technology, the mean time for detecting an anomaly in a network may be reduced thereby preventing the potential for more serious anomalies in the network.

20 Claims, 7 Drawing Sheets

| KPI Rules 206 | | |
|---|---|---|
| First KPI | Second KPI | |
| Data Quality | Data Quality + Voice Quality | If + correlation, accept |
| Data Quality | Data Quality + Voice Quality | If - correlation, accept |
| Data Quality | Data Quality + Voice Quality | If no correlation, accept |
| Data Quality | Data Quality + Voice Quality | If + correlation, reject |
| Data Quality | Data Quality + Voice Quality | If - correlation, reject |
| Data Quality | Data Quality + Voice Quality | If no correlation, reject |
| Voice Quality | Data Quality + Voice Quality | If + correlation, accept |
| Voice Quality | Data Quality + Voice Quality | If - correlation, accept |
| Voice Quality | Data Quality + Voice Quality | If no correlation, accept |
| Voice Quality | Data Quality + Voice Quality | If + correlation, reject |
| Voice Quality | Data Quality + Voice Quality | If - correlation, reject |
| Voice Quality | Data Quality + Voice Quality | If no correlation, reject |
| Data Quality + Voice Quality | Voice Quality | If + correlation, narrow to voice |
| Data Quality + Voice Quality | Voice Quality | If - correlation, narrow to voice |
| Data Quality + Voice Quality | Voice Quality | If no correlation, narrow to voice |
| Data Quality + Voice Quality | Data Quality | If + correlation, narrow to data |
| Data Quality + Voice Quality | Data Quality | If - correlation, narrow to data |
| Data Quality + Voice Quality | Data Quality | If no correlation, narrow to data |

NETWORK ANOMALY DETECTION USING A MULTIVARIATE-RELATIONS ENGINE

CROSS-REFERENCE TO RELATED APPLICATIONS

This application is a continuation of U.S. application Ser. No. 17/470,737, filed Sep. 9, 2021, entitled Network Anomaly Detection using a Multivariate-Relations Engine, the entirety of which is incorporated herein by reference.

BACKGROUND

Quick, accurate, and precise anomaly detection for a communications network are important tools for preventing network degradation and corresponding subscriber complaints. There are various conventional algorithms for detecting anomalies in a network. For example, in certain conventional anomaly detection methods, past measurements for cellular network performance indicators, known as Key Performance Indicators (KPIs), are used to approximate a model of a normally-operating network. When a new measurement is received, it is compared to the model. If the measurement is statistically incompatible with the model, then the measurement is flagged as an anomaly. Statistical models can also be used on a window of measurements in addition to a single measurement. For example, in current cellular networks, various network measurements may be taken over a two-week period of time. Measurements taken in a third week may then be compared to the running average of measurements taken over the prior two-week period and flagged as an anomaly based on how different the measurement is in comparison to the running average. In other conventional anomaly detection methods, a static threshold, i.e. a hard threshold, can be set for various metrics. If a measurement surpasses this threshold, an anomaly will be detected. Conventional approaches, such as running average and hard thresholds, however, do not associate different key performance measurements together in detecting anomalies, which results in too many false alarms and an inability to pinpoint the actual problem in the network. This, in turn, wastes operator time in trying to detect true network problems.

SUMMARY

The present disclosure is directed, in part, to systems and methods for network anomaly detection using multivariate relations substantially as shown in and/or described in connection with at least one of the figures, and as set forth more completely in the claims. In contrast to conventional approaches, an engine may be trained with a plurality of KPI rules that associate together two or more KPIs. Upon detecting an anomaly for a KPI in a datastream, one or more of the plurality of rules may be used to accept, reject, or narrow the anomaly by comparing a first KPI with a second KPI. In these ways, false-alarm anomalies can be detected and actual anomalies can be confirmed and/or further pinpointed, resulting in a significant reduction in the mean time for detecting an anomaly, which can prevent more serious network anomalies, such as a network failure. In addition, corresponding operator time and expense in conjunction with analyzing potential network anomalies can be reduced. This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE DRAWINGS

Illustrative embodiments of the present invention are described in detail below with reference to the attached figures, which are intended to be exemplary and non-limiting, wherein.

DETAILED DESCRIPTION

The subject matter of embodiments of the invention is described with specificity herein to meet statutory requirements. However, the description itself is not intended to limit the scope of this patent. The claimed subject matter might be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly described.

In certain aspects, a method is provided for monitoring a node in a communication network. In embodiments, an engine may be trained with a plurality of KPI rules. Each of the plurality of KPI rules may associate two or more KPIs together. Data comprising a plurality of KPIs may be received. Using the engine, an anomaly may be detected in a first KPI. In other embodiments, the engine may apply one or more of the KPI rules to compare the first KPI with a second KPI to accept the anomaly.

In other aspects, a method is provided for monitoring a node in a communication network. In embodiments, an engine may be trained with a plurality of KPI rules. The plurality of KPI rules may each associate two or more KPIs together. Data comprising a plurality of KPIs may be received. Using the engine, an anomaly may be detected in a first KPI. In other embodiments, an engine may apply one or more of the KPI rules to compare the first KPI with a second KPI to reject the anomaly.

In further aspects, a method is provided for monitoring a node in a communication network. In embodiments, an engine may be trained with a plurality of KPI rules. The plurality of KPI rules may each associate two or more KPIs together. Data comprising a plurality of KPIs may be received. Using the engine, an anomaly may be detected in a first KPI. In other embodiments, an engine may apply one or more of the KPI rules to narrow the anomaly.

In still further aspects, a system for monitoring a node in a communication network is provided. The system may comprise one or more processing units and one or more computer storage hardware devices storing computer-usable instructions. When used by the processor, the computer-usable instructions may cause the processor to train an engine with a plurality of KPI rules. The KPI rules may each comprise associating two or more KPIs together. When used by the processor, the computer-usable instructions may cause the processor to receive data comprising a plurality of KPIs from a node in a communication network. When used by the processor, the computer-usable instructions may detect an anomaly in a first KPI using the engine. When used by the processor, the computer-usable instructions may also apply one or more of the KPI rules using the engine to compare the first KPI to the second KPI to accept the anomaly.

In still further aspects, a system for monitoring a node in a communication network is provided. The system may comprise one or more processing units and one or more computer storage hardware devices storing computer-usable instructions. When used by the processor, the computer-usable instructions may cause the processor to train an engine with a plurality of KPI rules. The KPI rules may each comprise associating two or more KPIs together. When used by the processor, the computer-usable instructions may cause the processor to receive data comprising a plurality of KPIs from a node in a communication network. When used by the processor, the computer-usable instructions may detect an anomaly in a first KPI using the engine. When used by the processor, the computer-usable instructions may also apply one or more of the KPI rules using the engine to compare the first KPI to the second KPI to reject the anomaly.

Advantageously, providing methods and systems for monitoring a node in a communication network using an engine that associates different KPIs together, more false alarms can be identified, actual anomalies can be confirmed, and other anomalies can be further pinpointed thereby resulting in a significant reduction in the mean time for resolving a network problem.

Throughout this disclosure, several acronyms and shorthand notations are used to aid the understanding of certain concepts pertaining to the associated system and services. These acronyms and shorthand notations are intended to help provide an easy methodology of communicating the ideas expressed herein and are not meant to limit the scope of aspects herein.

Embodiments herein may be embodied as, among other things: a method, system, or set of instructions embodied on one or more computer-readable media. Computer-readable media include both volatile and nonvolatile media, removable and nonremovable media, and contemplate media readable by a database, a switch, and various other network devices. Computer-readable media includes media implemented in any way for storing information. Examples of stored information include computer-useable instructions, data structures, program circuitry, and other data representations. Media examples include RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently. Embodiments may take the form of a hardware embodiment, or an embodiment combining software and hardware. Some embodiments may take the form of a computer-program product that includes computer-useable or computer-executable instructions embodied on one or more computer-readable media.

"Computer-readable media" may be any available media and may include volatile and nonvolatile media, as well as removable and non-removable media. By way of example, and not limitation, computer-readable media may include computer storage media and communication media.

"Computer storage media" may include, without limitation, volatile and nonvolatile media, as well as removable and non-removable media, implemented in any method or technology for storage of information, such as computer-readable instructions, data structures, program circuitry, or other data. In this regard, computer storage media may include, but is not limited to, Random Access Memory (RAM), Read-Only Memory (ROM), Electrically Erasable Programmable Read-Only Memory (EEPROM), flash memory or other memory technology, CD-ROM, digital versatile disks (DVDs) or other optical disk storage, magnetic cassettes, magnetic tape, magnetic disk storage, or other magnetic storage devices, or any other medium which may be used to store the desired information and which may be accessed by the computing device 700 shown in FIG. 5. Computer storage media does not comprise a signal per se.

"Communication media" may include, without limitation, computer-readable instructions, data structures, program circuitry, or other data in a modulated data signal, such as a carrier wave or other transport mechanism, and may include any information delivery media. As used herein, the term "modulated data signal" refers to a signal that has one or more of its attributes set or changed in such a manner as to encode information in the signal. By way of example, and not limitation, communication media includes wired media such as a wired network or direct-wired connection, and wireless media such as acoustic, radio frequency (RF), infrared, and other wireless media. Combinations of any of the above also may be included within the scope of computer-readable media.

A "network" refers to a network comprised of wireless and wired components that provide wireless communications service coverage to one or more UE. The network may comprise one or more base stations, one or more cell sites (i.e., managed by a base station), one or more cell towers (i.e., having an antenna) associated with each base station or cell site, a gateway, a backhaul server that connects two or more base stations, a database, a power supply, sensors, and other components not discussed herein, in various embodiments.

The terms "base station" and "cell site" may be used interchangeably herein to refer to a defined wireless communications coverage area (i.e., a geographic area) serviced by a base station. It will be understood that one base station may control one cell site or alternatively, one base station may control multiple cell sites. As discussed herein, a base station is deployed in the network to control and facilitate, via one or more antenna arrays, the broadcast, transmission, synchronization, and receipt of one or more wireless signals in order to communicate with, verify, authenticate, and provide wireless communications service coverage to one or more UE that request to join and/or are connected to a network.

An "access point" may refer to hardware, software, devices, or other components at a base station, cell site, and/or cell tower having an antenna, an antenna array, a radio, a transceiver, and/or a controller. Generally, an access point may communicate directly with user equipment according to one or more access technologies (e.g., 3G, 4G, LTE, 5G, mMIMO) as discussed hereinafter.

The terms "user equipment," "UE," and "user device" are used interchangeably to refer to a device employed by an end-user that communicates using a network. UE generally includes one or more antenna coupled to a radio for exchanging (e.g., transmitting and receiving) transmissions with a nearby base station, via an antenna array of the base station. In embodiments, UE may take on any variety of devices, such as a personal computer, a laptop computer, a tablet, a netbook, a mobile phone, a smart phone, a personal digital assistant, a wearable device, a fitness tracker, or any other device capable of communicating using one or more resources of the network. UE may include components such as software and hardware, a processor, a memory, a display component, a power supply or power source, a speaker, a touch-input component, a keyboard, and the like. In embodiments, some of the UE discussed herein may include current UE capable of using 5G and having backward compatibility with prior access technologies, current UE capable of using 5G and lacking backward compatibility with prior access technologies, and legacy UE that is not capable of using 5G.

The terms "radio," "controller," "antenna," and "antenna array" are used interchangeably to refer to one or more software and hardware components that facilitate sending and receiving wireless radio-frequency signals, for example, based on instructions from a base station. A radio may be used to initiate and generate information that is then sent out through the antenna array, for example, where the radio and antenna array may be connected by one or more physical paths. Generally an antenna array comprises a plurality of individual antenna elements. The antennas discussed herein may be dipole antennas, having a length, for example, of ¼, ½, 1, or 1½ wavelength. The antennas may be monopole, loop, parabolic, traveling-wave, aperture, yagi-uda, conical spiral, helical, conical, radomes, horn, and/or apertures, or any combination thereof. The antennas may be capable of sending and receiving transmission via FD-MIMO, Massive MIMO, 3G, 4G, 5G, and/or 802.11 protocols and techniques.

Additionally, it will be understood that terms such as "first," "second," and "third" are used herein for the purposes of clarity in distinguishing between elements or features, but the terms are not used herein to import, imply, or otherwise limit the relevance, importance, quantity, technological functions, sequence, order, and/or operations of any element or feature unless specifically and explicitly stated as such.

Figure 1:
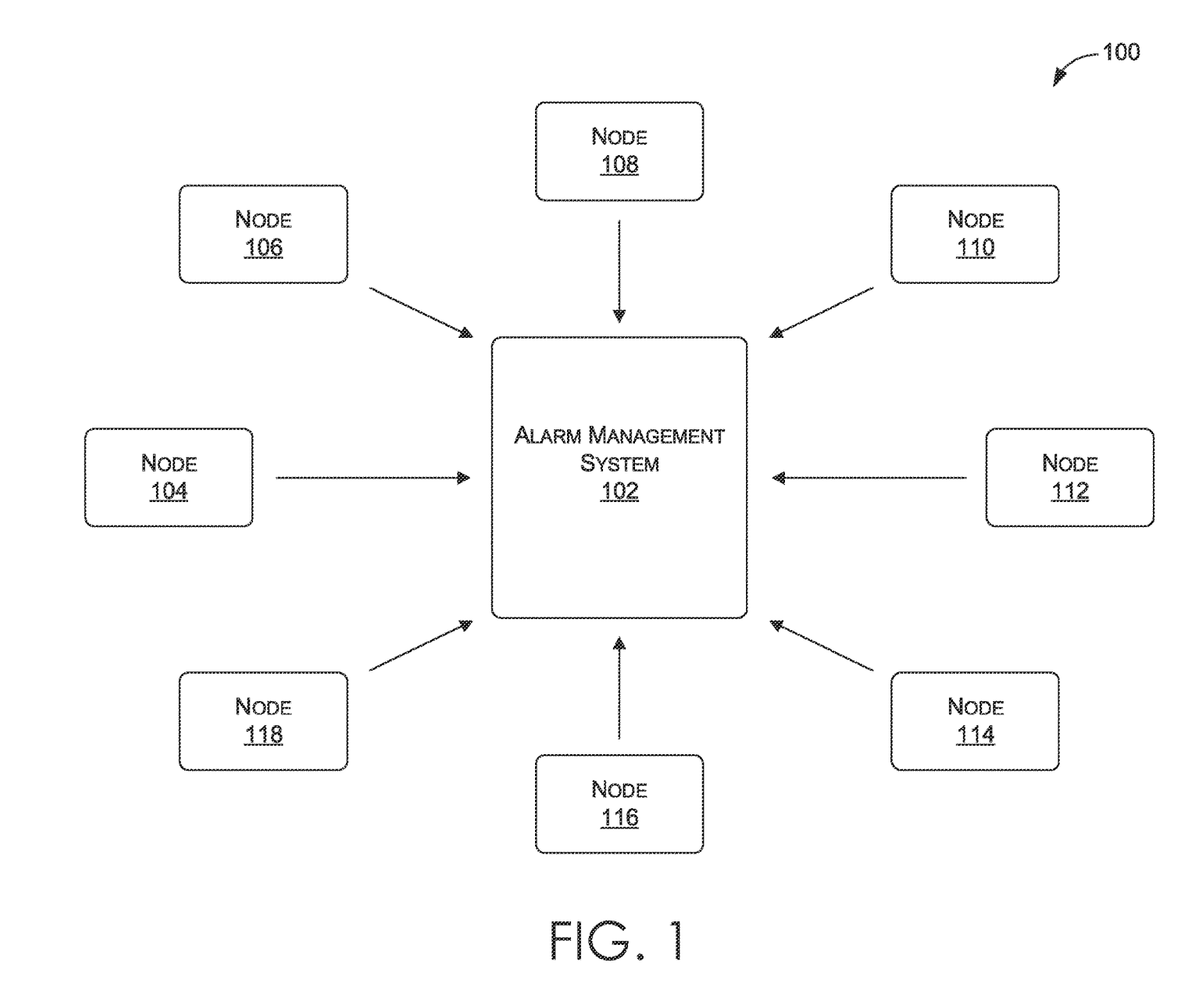
FIG. 1 depicts an example of a network environment in accordance with embodiments of the present disclosure.

FIG. 1 depicts a high-level example of a network environment 100 in accordance with embodiments of the present disclosure. The network environment 100 is but one example of a suitable network environment and is not intended to suggest any limitation as to the scope of use or functionality of the disclosure. Neither should the network environment 100 be interpreted as having any dependency or requirement relating to any one or combination of components illustrated.

The network environment 100 may include an alarm management system 102. In some embodiments, the network environment 100 may be a telecommunication network (e.g., a telecommunication network such as, but not limited to, a wireless telecommunication network), or portion thereof. The network environment 100 may include one or more devices and components, such as base stations, servers, switches, relays, amplifiers, databases, nodes, etc. which are not shown so as to not confuse other aspects of the present disclosure. Those devices and components may provide connectivity in a variety of implementations. In addition, the network environment 100 may be utilized in a variety of manners, such as a single network, multiple networks, or as a network of networks, but, ultimately, is shown as simplified as possible to avoid the risk of confusing other aspects of the present disclosure.

The alarm management system 102 may receive KPI measurements from various nodes 104-118. Nodes 104-118 may be any components of a communication network, including a component from an evolved packet core, such as a Mobile Management Entity (MME), a Telephony Application Server (TAS), a Packet Data Network Gateway (PGW), a Home Subscriber Server (HSS), a Policy and Charging Rules Function (PCRF), an Enhanced Serving Mobile Location Center (E-SMLC) 208, or a Gateway Mobile Location Center (GMLC), or a component from a 5G core (5GC). One or more of nodes 104-118 may also be components of a radio access network, such a remote radio head, an eNodeB, a gNodeB, a baseband unit, or a mobile switching unit. One or more nodes 104-118 may also be an IP router. The network environment 100 may include any communication network providing voice and/or data service(s), such as, for example, a 1× circuit voice, a 3G network (e.g., CDMA, CDMA 2000, WCDMA, GSM, UMTS, a 4G network (LTE, WiMAX, HSDPA), 5G, or a 6G network.

Having described network environments 100 and components operating therein, it will be understood by those of ordinary skill in the art that the network environment 100 is but an example of a suitable network and is not intended to limit the scope of use or functionality of aspects described herein. Similarly, network environment 100 should not be interpreted as imputing any dependency and/or any requirements with regard to each component and combination(s) of components illustrated in FIG. 1. It will be appreciated by those of ordinary skill in the art that the number, interactions, and physical location of components illustrated in FIG. 1 is an example, as other methods, hardware, software, components, and devices for establishing one or more communication links between the various components may be utilized in implementations of the present invention. It will be understood to those of ordinary skill in the art that the components may be connected in various manners, hardwired or wireless, and may use intermediary components that have been omitted or not included in FIG. 1 for simplicity's sake. As such, the absence of components from FIG. 1 should not be interpreted as limiting the present invention to exclude additional components and combination(s) of components. Moreover, though components may be represented as singular components or may be represented in a particular quantity in FIG. 1 it will be appreciated that some aspects may include a plurality of devices and/or components such that FIG. 1 should not be considered as limiting the quantity of any device and/or component.

Figure 2:
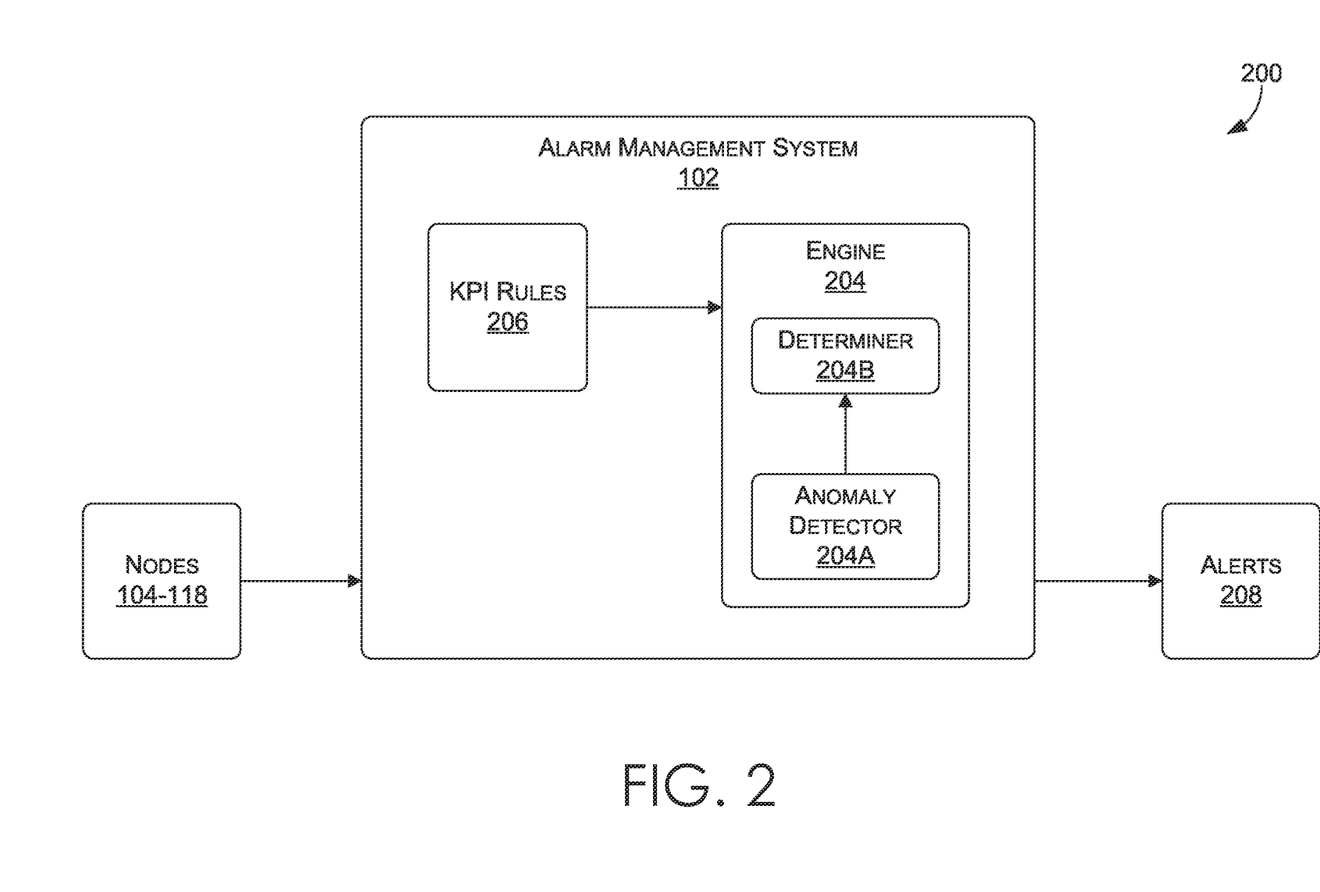
FIG. 2 depicts an example of a network environment in accordance with embodiments of the present disclosure.
Figure 3:
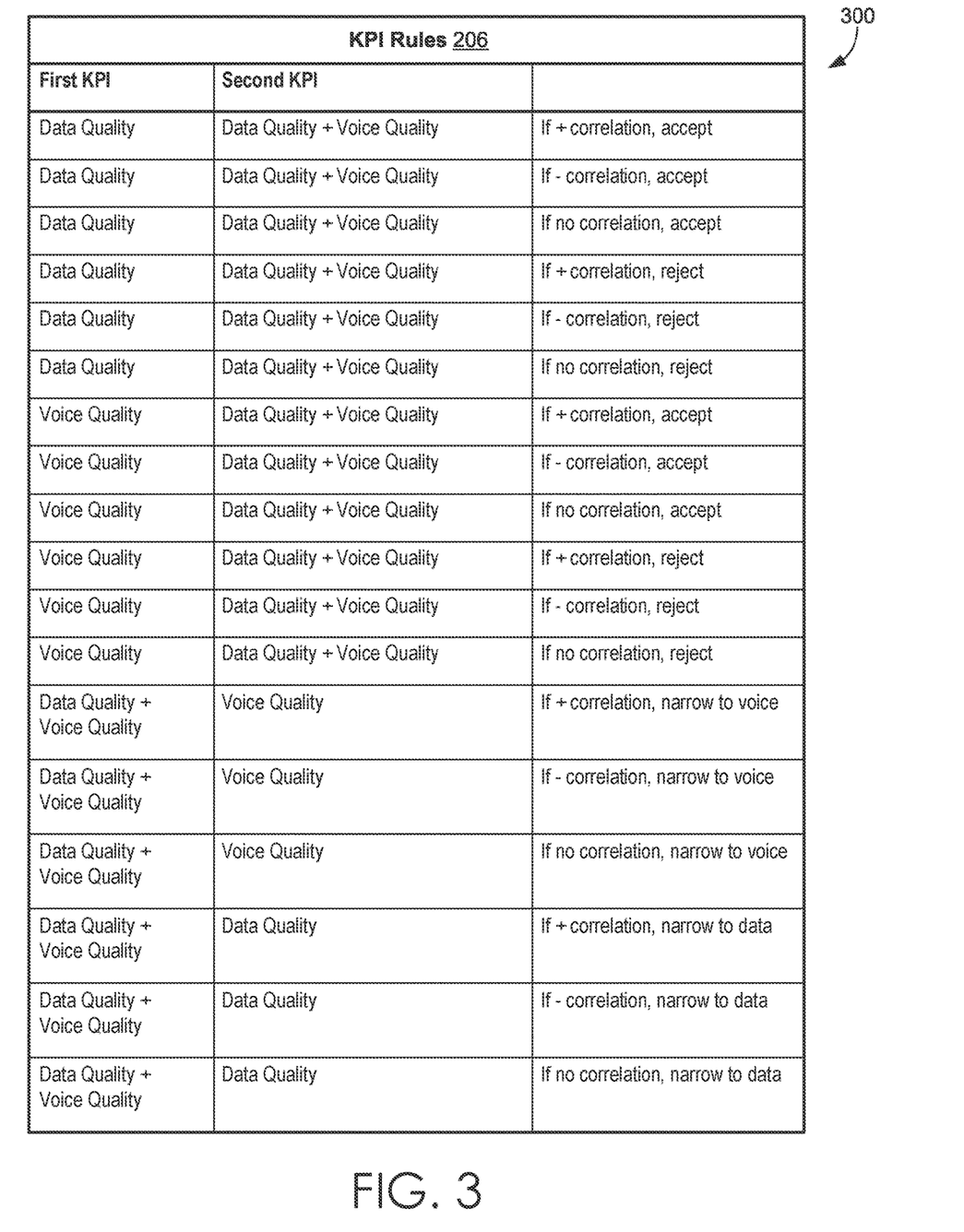
FIG. 3 is a table of examples of KPI rules that may be used in accordance with some embodiments of the present disclosure.

FIG. 2 illustrates another example of the alarm management system 102 in certain embodiments. For example, the alarm management system 102 may include an engine 204. The engine 204 may include an anomaly detector 204A and a determiner 204B. In addition, the alarm management system 204 may include a plurality of KPI rules 206. KPIs may be metrics established to quantify specific aspects of a functioning communication network related to service quality, may take on various forms, and may represent various quality issues relating to a communication network. In embodiments, the engine 204 may be trained with the plurality of KPI rules 206. FIG. 3 provides a table of certain examples of KPI rules 206 that the engine 204 may be trained with.

For example, the engine may be trained with KPIs rules that include a data quality component. The engine may also be trained on KPI rules that include a voice quality component. In still other examples, the engine may be trained on KPIs rules that include a voice quality component and a data quality component. More specifically, the engine 206 may be trained such that upon detection of an anomaly by the anomaly detector 204A in a first KPI having a data quality component, the engine, using the determiner 204B, may accept the anomaly in the first KPI by comparing the first KPI with a second KPI having both a data quality component and a voice quality component. In embodiments, the determiner 204B may be trained to accept the anomaly in the first KPI by determining that there is a positive correlation between the first KPI and the second KPI. In other embodiments, the determiner 204B may be trained to accept the anomaly in the first KPI by determining that there is a negative correlation between the first KPI and the second KPI. In still other embodiments, the determiner 204B may be trained to accept the anomaly in the first KPI be determining that there is no correlation between the first KPI and the second KPI.

In other examples, the engine 206 may be trained such that upon detection of an anomaly by the anomaly detector 204A in a first KPI having a data quality component, the engine, using the determiner 204B, may reject the anomaly in the first KPI by comparing the first KPI with a second KPI having both a data quality component and a voice quality component. In embodiments, the determiner 204B may be trained to reject the anomaly in the first KPI by determining that there is a positive correlation between the first KPI and the second KPI. In other embodiments, the determiner 204B may be trained to reject the anomaly in the first KPI by determining that there is a negative correlation between the first KPI and the second KPI. In still other embodiments, the determiner 204B may be trained to reject the anomaly in the first KPI be determining that there is no correlation between the first KPI and the second KPI.

In still other examples, the engine 206 may be trained such that upon detection of an anomaly by the anomaly detector 204A in a first KPI having a voice quality component, the engine, using the determiner 204B, may accept the anomaly in the first KPI by comparing the first KPI with a second KPI having both a data quality component and a voice quality component. In embodiments, the determiner 204B may be trained to accept the anomaly in the first KPI by determining that there is a positive correlation between the first KPI and the second KPI. In other embodiments, the determiner 204B may be trained to accept the anomaly in the first KPI by determining that there is a negative correlation between the first KPI and the second KPI. In still other embodiments, the determiner 204B may be trained to accept the anomaly in the first KPI be determining that there is no correlation between the first KPI and the second KPI.

In examples, the engine 206 may be trained such that upon detection of an anomaly by the anomaly detector 204A in a first KPI having a voice quality component, the engine, using the determiner 204B, may reject the anomaly in the first KPI by comparing the first KPI with a second KPI having both a data quality component and a voice quality component. In embodiments, the determiner 204B may be trained to reject the anomaly in the first KPI by determining that there is a positive correlation between the first KPI and the second KPI. In other embodiments, the determiner 204B may be trained to reject the anomaly in the first KPI by determining that there is a negative correlation between the first KPI and the second KPI. In still other embodiments, the determiner 204B may be trained to reject the anomaly in the first KPI be determining that there is no correlation between the first KPI and the second KPI.

In still further examples, the engine 206 may be trained such that upon detection of an anomaly by the anomaly detector 204A in a first KPI having a data quality component and a voice quality component, the engine, using the determiner 204B, may narrow the anomaly in the first KPI to a voice quality component by comparing the first KPI with a second KPI having a voice quality component. In embodiments, the determiner 204B may be trained to narrow the anomaly in the first KPI to a voice quality component by determining that there is a positive correlation between the first KPI and the second KPI. In other embodiments, the determiner 204B may be trained to narrow the anomaly in the first KPI to a voice quality component by determining that there is a negative correlation between the first KPI and the second KPI. In still other embodiments, the determiner 204B may be trained to narrow the anomaly in the first KPI to a voice quality component by determining that there is no correlation between the first KPI and the second KPI.

In other examples, the engine 206 may be trained such that upon detection of an anomaly by the anomaly detector 204A in a first KPI having a data quality component and a voice quality component, the engine, using the determiner 204B, may narrow the anomaly in the first KPI to a data quality component by comparing the first KPI with a second KPI having a data quality component. In embodiments, the determiner 204B may be trained to narrow the anomaly in the first KPI to a data quality by determining that there is a positive correlation between the first KPI and the second KPI. In other embodiments, the determiner 204B may be trained to narrow the anomaly in the first KPI to a data quality component by determining that there is a negative correlation between the first KPI and the second KPI. In still other embodiments, the determiner 204B may be trained to narrow the anomaly in the first KPI to a data quality component by determining that there is no correlation between the first KPI and the second KPI.

Referring back to FIG. 2, in embodiments, the alarm management system 102 may receive data comprising a plurality of KPIs from one or more of the nodes 104-118. The anomaly detector 204A of the engine 204 may detect an anomaly or outlier measurement in one or more of the KPIs. Using one or more of the KPI rules 206 that engine 204 has been trained on, the determiner 204B of engine 204 may accept, reject, or narrow the anomaly. In the case that an anomaly is accepted, rejected, or narrowed, one or more alerts 208 may be sent, indicating that the anomaly is accurate, the anomaly was false, or the anomaly has been refined.

Figure 4:
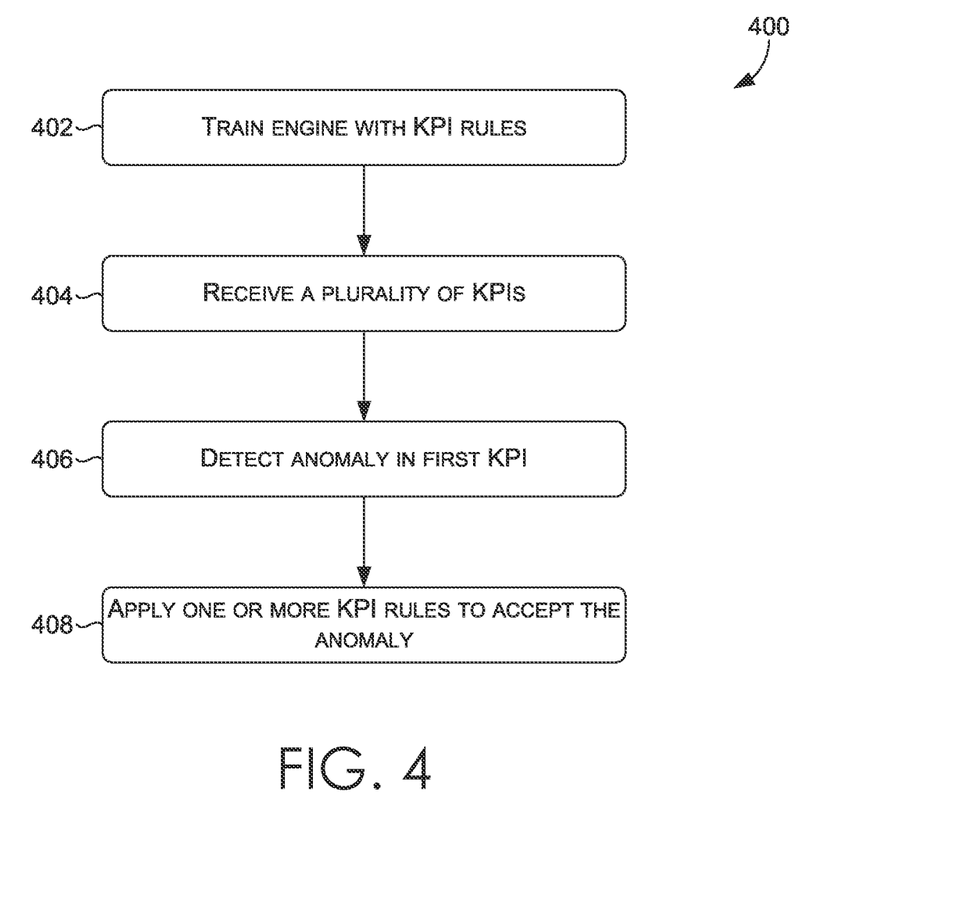
FIG. 4 is a flow diagram showing a method in accordance with some embodiments of the present disclosure.

FIG. 4 depicts a flow diagram of an example method 400 for monitoring a node in a communication network in accordance with implementations of the present disclosure. Initially, at block 400, an engine, such as engine 204, is trained with a plurality of KPI rules. In embodiments, each of the plurality of KPI rules, such as the KPI rules 206, comprises associating two or more KPIs together. For example, in embodiments, a KPI rule is created by associating a first KPI having a data quality component with a second KPI having a data quality component and a voice component. In further embodiments, the engine may be trained with a rule to accept a detected anomaly in the first KPI when there is positive correlation with the second KPI. For example, the engine 204 may be trained with a rule to accept a detected anomaly if the first KPI decreases and the second KPI decreases. In other embodiments, the engine may be trained with one or more rules to accept a detected anomaly in the first KPI when there is a negative correlation with the second KPI. For example, the engine 204 may be trained with a rule to accept a detected anomaly if the first KPI decreases and the second KPI increases. In still further embodiments, the engine may be trained with a rule to accept a detected anomaly in the first KPI when there is no correlation between the first KPI and the second KPI.

At block 404, a plurality of KPIs may be received. For example, the alarm management system 102 and/or the engine 204 may receive data comprising a plurality of KPIs from a node in a communication network, such as measurements for a first, second, and third KPI. At block 406, an anomaly may be detected in a first KPI. For example, the anomaly detector 204A of the engine 204 may detect an anomaly in a first KPI, having a data quality component, such as a decrease below the normal average for the first KPI. At block 408, upon detecting an anomaly in the first KPI, one or more of the plurality of KPI rules may be applied to accept the anomaly. For example, the determiner 204B of the engine 204, may apply one or more of the KPI rules 206 by comparing the first KPI with the second KPI to accept the anomaly. For example, using a rule that if there is an anomaly detected in a first KPI, and if the first KPI has a positive correlation with a second KPI the anomaly should be accepted, the determiner 204B may accept the first KPI if the determiner 204B determines that there is a decrease in the first KPI and a decrease in the second KPI. In other examples, using a rule that if there is an anomaly detected in a first KPI, and if the first KPI has a negative correlation with a second KPI the anomaly should be accepted, the determiner 204B may accept the first KPI if the determiner 204B determines that there is a decrease in the first KPI and an increase in the second KPI. In still further examples, using a rule that if there is an anomaly detected in a first KPI, and if the first KPI has no correlation with a second KPI the anomaly should be accepted, the determiner 204B may accept the first KPI if the determiner 204B determines that there is no correlation between the two.

Figure 5:
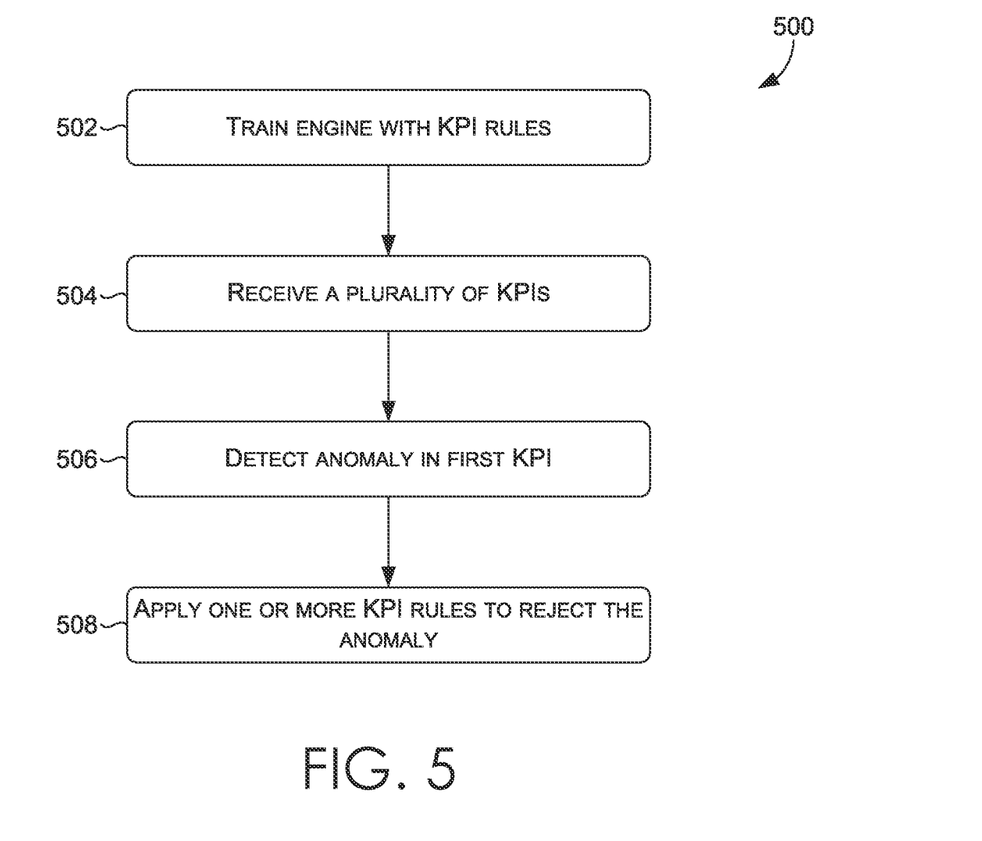
FIG. 5 is a flow diagram showing a method in accordance with some embodiments of the present disclosure.

FIG. 5 depicts a flow diagram of an example method 500 for monitoring a node in a communication network in accordance with implementations of the present disclosure. Initially, at block 500, an engine, such as the engine 204, is trained with a plurality of KPI rules, such as KPI rules 206. In embodiments, each of the plurality of KPI rules comprises associating two or more KPIs together. For example, in embodiments, a KPI rule is created by associating a first KPI having a voice quality component with a second KPI having a data quality component and a voice component. In further embodiments, the engine 204 may be trained with a rule to reject a detected anomaly in the first KPI when there is positive correlation with the second KPI. For example, the engine 204 may be trained with a rule to reject a detected anomaly if the first KPI increases and the second KPI increases. In other embodiments, the engine 204 may be trained with one or more rules to reject a detected anomaly in the first KPI when there is a negative correlation with the second KPI. For example, the engine 204 may be trained with a rule to accept a detected anomaly if the first KPI increases and the second KPI decreases. In still further embodiments, the engine 204 may be trained with a rule to reject a detected anomaly in the first KPI when there no correlation between a first KPI and a second KPI, such as when there is an increase in a first KPI and no change in a second KPI.

At block 504, a plurality of KPIs may be received. For example, the alarm management system 102 and/or the engine 204 may receive data comprising a plurality of KPIs from a node in a communication network, such as measurements for a first, second, and third KPI. At block 506, an anomaly may be detected in a first KPI. For example, the anomaly detector 204A of the engine 204 may detect an anomaly in a first KPI, having a voice quality component, such as an increase above the normal average for the first KPI. At block 508, upon detecting an anomaly in the first KPI, one or more of the plurality of KPI rules may be applied to accept the anomaly. For example, the determiner 204B of the engine 204, may apply one or more of the KPI rules 206 by comparing the first KPI with the second KPI to reject the anomaly. Using a rule that if there is an anomaly detected in a first KPI, and if the first KPI has a positive correlation with a second KPI the anomaly should be rejected, the determiner 204B may reject the first KPI if determiner 204B determines that there is an increase in the first KPI and the second KPI. In other examples, using a rule that if there is an anomaly detected in a first KPI, and if the first KPI has a negative correlation with a second KPI the anomaly should be rejected, the determiner 204B may reject the first KPI if determiner 204B determines that the first KPI has increased and the second KPI has decreased. In still further examples, using a rule that if there is an anomaly detected in a first KPI, and if the first KPI has no correlation with a second KPI the anomaly should be rejected, the determiner 204B may reject the first KPI if determiner 204B determines that there is no correlation between a first KPI and a second KPI, such as when there is a decrease in a first KPI and no change in a second KPI.

Figure 6:
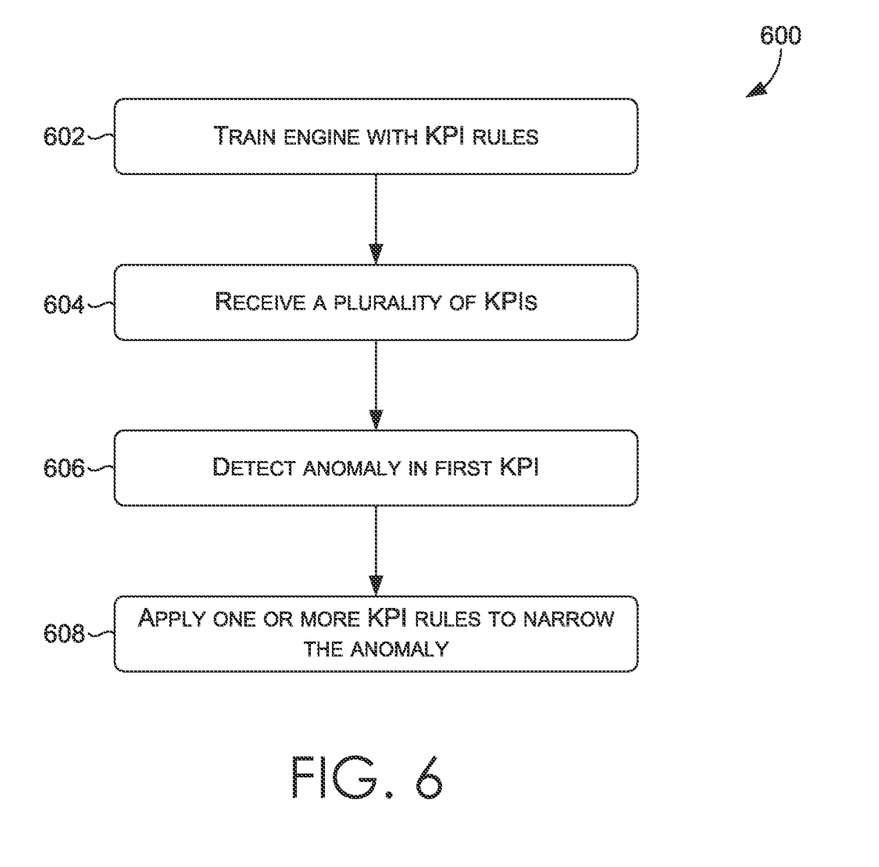
FIG. 6 is a flow diagram showing a method in accordance with some embodiments of the present disclosure.

FIG. 6 depicts a flow diagram of an example method 600 for monitoring a node in a communication network in accordance with implementations of the present disclosure. Initially, at block 600, an engine, such as the engine 204, is trained with a plurality of KPI rules, such as KPI rules 206. In embodiments, each of the plurality of KPI rules comprises associating two or more KPIs together. For example, in embodiments, a KPI rule is created by associating a first KPI having a voice quality component and a data quality component with a second KPI having a data quality component. In further embodiments, the engine 204 may be trained with a rule to narrow a detected anomaly in the first KPI when there is positive correlation with the second KPI. For example, the engine may be trained with a rule to narrow a detected anomaly if the first KPI increases and the second KPI increases. That is, the engine may be trained to narrow the anomaly such that is specifically indicates that the anomaly is associated with data quality. In other embodiments, the engine may be trained with one or more rules to narrow a detected anomaly in the first KPI when there is a negative correlation with the second KPI. For example, the engine may be trained with a rule to narrow a detected anomaly to specifically indicate that the anomaly is associated with data quality if the first KPI, having a voice quality component and a data quality component, increases and the second KPI, having a data quality component decreases. In still further embodiments, the engine may be trained with a rule to narrow a detected anomaly in the first KPI when there is no correlation between the first KPI and the second KPI. For example, the engine may be trained with a rule to narrow a detected anomaly to specifically indicate that the anomaly is associated with data quality if the first KPI, having a voice quality component and data quality component, increases and the second KPI, having a voice quality component, remains the same. In certain embodiments, PGW KPIs may be correlated together, namely a Gx_success_rate KPI, having a voice and data component, and a Fail_Open KPI, having a data component, to narrow network anomalies. In embodiments, if an anomaly is detected in the Gx_success_rate KPI, the engine may be trained with a rule to narrow the detected anomaly to specifically indicate that the anomaly is associated with voice quality if Gx_success_rate has declined and Fail_Open KPI has not been impacted. In other embodiments, anomalous KPIs are further correlated with create session requests to confirm whether a node is in rotation to further avoid false alerts. For example, in embodiments, a flag may be added in an email alert to confirm whether or not the anomaly occurred during the maintenance window time period. In some embodiments, the maintenance window time period for one or more nodes may occur daily from 12 a.m. to 5 a.m. market local time.

At block 604, a plurality of KPIs may be received. For example, the alarm management system 102 and/or the engine 204 may receive data comprising a plurality of KPIs from a node in a communication network, such as measurements for a first, second, and third KPI. At block 606, an anomaly may be detected in a first KPI. For example, the anomaly detector 204A of the engine 204 may detect an anomaly in the first KPI, having a voice quality component and data quality component, such as an increase above the normal average for the first KPI. At block 608, upon detecting an anomaly in the first KPI, one or more of the plurality of KPI rules may be applied to narrow the anomaly. For example, the determiner 204B of the engine 204, may apply one or more of the KPI rules 206 by comparing the first KPI with the second KPI to narrow the anomaly. The determiner 204B may be trained to narrow an anomaly detected in a first KPI to a data quality component if an anomaly is detected in a first KPI, having a voice quality component and data quality component, and if the first KPI has a positive correlation with a second KPI, having a data quality component. Accordingly, the determiner 204B may narrow the anomaly to specifically indicate a data quality component if the determiner 204B determines that there is an increase in the first KPI and the second KPI. In other examples, the determiner 204B may use a rule that if there is an anomaly detected in a first KPI, having a voice quality component and a data quality component, and if the first KPI has a negative correlation with a second KPI, having a voice quality component, the anomaly should be narrowed to a voice quality component. Accordingly, the determiner 204B may narrow the anomaly in the first KPI to a voice quality component if determiner 204B determines that the first KPI has increased and the second KPI has decreased. In still further examples, the determiner 204B may be trained on a rule that if there is an anomaly detected in a first KPI, having a voice quality component and a data quality component, the anomaly should be narrowed to a voice quality component if the first KPI has no correlation with a second KPI. Therefore, the determiner 204B may narrow the first KPI, having a voice quality component and a data quality component, to a voice quality component if the first KPI has increases and the second KPI remains the same.

Figure 7:
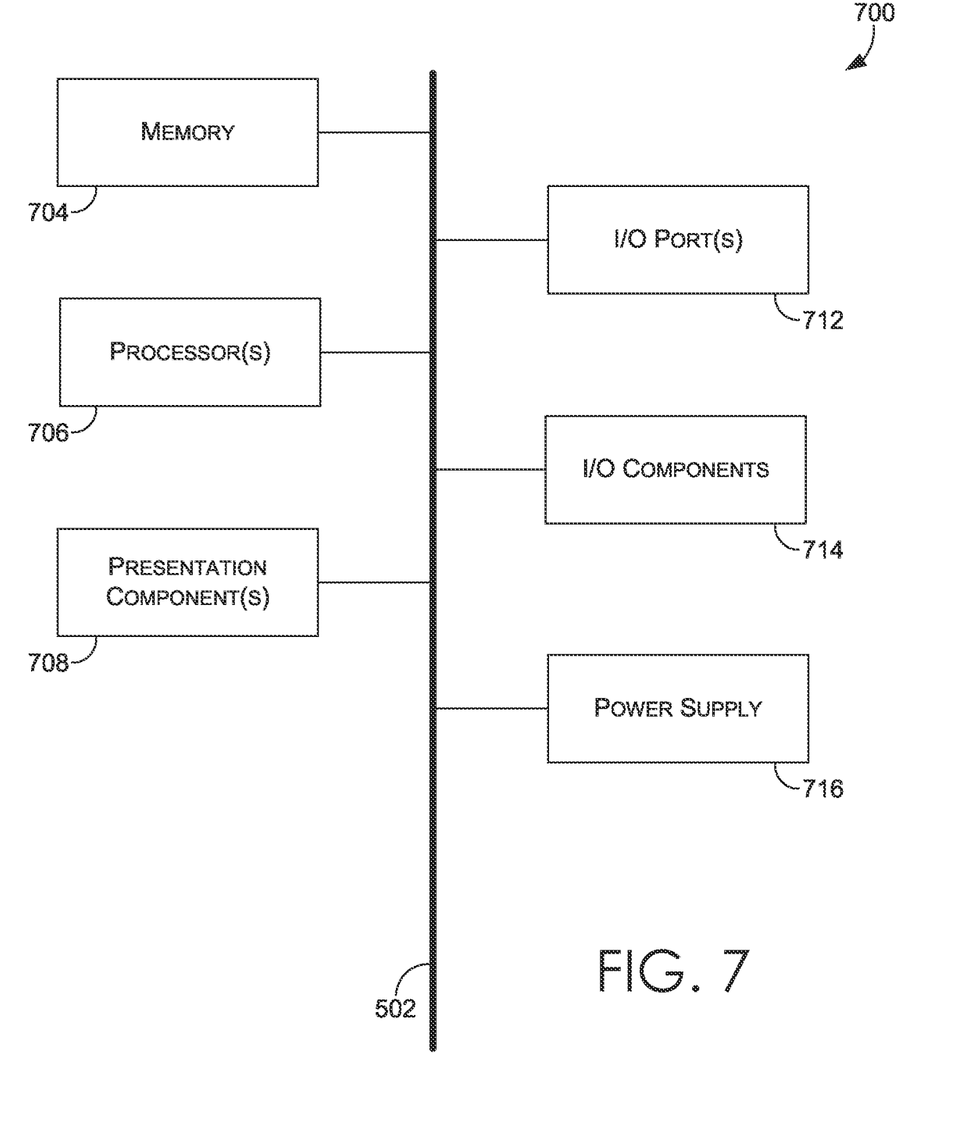
FIG. 7 depicts an exemplary computing device suitable for use in implementations of aspects herein.

Referring to FIG. 7, a block diagram of an example of a computing device 700 suitable for use in implementations of the technology described herein is provided. In particular, the exemplary computer environment is shown and designated generally as computing device 700. Computing device 700 is but one example of a suitable computing environment and is not intended to suggest any limitation as to the scope of use or functionality of the invention. Neither should computing device 700 be interpreted as having any dependency or requirement relating to any one or combination of components illustrated.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

As shown in FIG. 7, computing device 700 includes a bus 702 that directly or indirectly couples various components together. The bus 702 may directly or indirectly one or more of memory 704, processor(s) 706, presentation component(s) 708 (if applicable), input/output (I/O) port(s) 712, input/output (I/O) component(s) 714, and/or power supply 716. Although the components of FIG. 7 are shown with lines for the sake of clarity, in reality, delineating various components is not so clear, and metaphorically, the lines would more accurately be grey and fuzzy. For example, one may consider a presentation component(s) 708 such as a display device to be one of I/O components 714. Also, the processor(s) 706 may include memory 704, in another example. The present disclosure hereof recognizes that such is the nature of the art, and reiterates that FIG. 7 is merely illustrative of an example of a computing device 700 that may be used in connection with one or more implementations of the present disclosure. Distinction is not made between such categories as "workstation," "server," "laptop," "handheld device," etc., as all are contemplated within the scope of the present disclosure and refer to "computer" or "computing device."

Memory 704 may take the form of memory components described herein. Thus, further elaboration will not be provided here, but it should be noted that memory 704 may include any type of tangible medium that is capable of storing information, such as a database or data store. A database or data store may be any collection of records, files, or information encoded as electronic data and stored in memory 704, for example. In one embodiment, memory 704 may include a set of embodied computer-readable and executable instructions that, when executed, facilitate various functions or elements disclosed herein. These embodied instructions will variously be referred to as "instructions" or an "application" for short.

Processor(s) 706 may be multiple processors that receive instructions and process them accordingly. Presentation component(s) 708, if available, may include a display device, an audio device such as a speaker, and/or other components that may present information through visual (e.g., a display, a screen, a lamp (LED), a graphical user interface (GUI), and/or even lighted keyboards), auditory, and/or other tactile or sensory cues.

A wireless telecommunication network might include an array of devices, which are not shown so as to not obscure more relevant aspects of the invention. Components such as a base station, a communications tower, or even access points (as well as other components) can provide wireless connectivity in some embodiments.

The input/output (I/O) ports 712 may take a variety of forms. Exemplary I/O ports 712 may include a USB jack, a stereo jack, an infrared port, a firewire port, other proprietary communications ports, and the like. Input/output (I/O) components 714 may comprise keyboards, microphones, speakers, touchscreens, and/or any other item usable to directly or indirectly input data into the computing device 700.

Power supply 716 may include batteries, fuel cells, and/or any other component that may act as a power source to supply power to the computing device 700 or to other network components, including through one or more electrical connections or couplings. Power supply 716 may be configured to selectively supply power to different components independently and/or concurrently.

Finally, regarding FIGS. 1 through 7, it will be understood by those of ordinary skill in the art that the environment(s), system(s), and/or methods(s) depicted are not intended to limit the scope of use or functionality of the present embodiments. Similarly, the environment(s), system(s), and/or methods(s) should not be interpreted as imputing any dependency and/or any requirements with regard to each component, each step, and combination(s) of components or step(s) illustrated therein. It will be appreciated by those having ordinary skill in the art that the connections illustrated the figures are contemplated to potentially include methods, hardware, software, and/or other devices for establishing a communications link between the components, devices, systems, and/or entities, as may be utilized in implementation of the present embodiments. As such, the absence of component(s) and/or steps(s) from the figures should be not be interpreted as limiting the present embodiments to exclude additional component(s) and/or combination(s) of components. Moreover, though devices and components in the figures may be represented as singular devices and/or components, it will be appreciated that some embodiments can include a plurality of devices and/or components such that the figures should not be considered as limiting the number of devices and/or components.

It is noted that aspects of the present invention are described herein with reference to block diagrams and flowchart illustrations. However, it should be understood that each block of the block diagrams and/or flowchart illustrations may be implemented in the form of a computer program product, an entirely hardware embodiment, a combination of hardware and computer program products, and/or apparatus, systems, computing devices/entities, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

Additionally, as should be appreciated, various embodiments of the present disclosure described herein can also be implemented as methods, apparatus, systems, computing devices/entities, computing entities, and/or the like. As such, embodiments of the present disclosure can take the form of an apparatus, system, computing device, computing entity, and/or the like executing instructions stored on a computer-readable storage medium to perform certain steps or operations. However, embodiments of the present disclosure can also take the form of an entirely hardware embodiment performing certain steps or operations.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned may be completed without departing from the scope of the claims below. Certain features and subcombinations are of utility and may be employed without reference to other features and subcombinations and are contemplated within the scope of the claims.

What is claimed is:

1. A system for improved anomaly detection in a wireless telecommunication network comprising:
   a radio access network configured to wirelessly communicate with a user equipment (UE) using a wireless communication link; and
   one or more computer processing components configured to perform a method comprising:
      detecting, based on a value of a first key performance indicator (KPI) associated with the wireless communication link exceeding a first predetermined threshold, an anomaly of the wireless communication link;
      applying a plurality of KPI rules to compare the first KPI and a second KPI associated with the wireless communication link wherein each KPI rule comprises associating two or more KPIs together; and
      confirming, based on a combination of the first KPI and the second KPI, the anomaly of the wireless communication link, the first KPI being different than the second KPI.

2. The system of claim 1, wherein the first KPI comprises a voice quality component.

3. The system of claim 2, wherein the second KPI comprises a data quality component.

4. The system of claim 3, wherein the second KPI further comprises a voice quality component.

5. The system of claim 1, wherein the first KPI is a data quality component.

6. The system of claim 5, wherein the second KPI comprises a voice quality component.

7. The system of claim 6, wherein the second KPI further comprises a data quality component.

8. The system of claim 1, wherein confirming the anomaly is based a positive correlation between the first KPI and the second KPI.

9. The system of claim 1, wherein confirming the anomaly is based on a negative correlation between the first KPI and the second KPI.

10. The system of claim 1, wherein confirming the anomaly is based on no correlation between the first KPI and the second KPI.

11. The system of claim 1, wherein the method further comprises communicating an anomaly alert to a network entity comprising an indication of the confirmed anomaly.

12. A method for improved anomaly detection in a wireless telecommunication network comprising:
   detecting, based on a value of a first key performance indicator (KPI) associated with the wireless communication link exceeding a first predetermined threshold, an anomaly of a wireless communication link used by a radio access network to wirelessly communicate with a user equipment (UE);

applying a plurality of KPI rules to compare the first KPI and a second KPI associated with the wireless communication link wherein each KPI rule comprises associating two or more KPIs together; and rejecting, based on a combination of the first KPI and the second KPI, the anomaly of the wireless communication link, the first KPI being different than the second KPI.

13. The method of claim 12, wherein the second KPI comprises a voice quality component.

14. The method of claim 13, wherein the first KPI comprises a data quality component.

15. The method of claim 13, wherein the first KPI comprises a voice quality component and the second KPI further comprises a data quality component.

16. The method of claim 12, wherein the method further comprises communicating an anomaly alert to a network entity comprising an indication of the rejected anomaly.

17. One or more non-transitory computer readable media having computer executable instructions stored thereon that, when executed by one or more computer processing components, cause the one or more computer processing components to perform a method for improved anomaly detection in a wireless telecommunication network comprising:

detecting, based on a value of a first key performance indicator (KPI) associated with the wireless communication link exceeding a first predetermined threshold, an anomaly of a wireless communication link used by a radio access network to wirelessly communicate with a user equipment (UE);

applying a plurality of KPI rules to compare the first KPI and a second KPI associated with the wireless communication link wherein each KPI rule comprises associating two or more KPIs together; and narrowing, based on a combination of the first KPI and the second KPI, the anomaly of the wireless communication link, the first KPI being different than the second KPI.

18. The one or more non-transitory computer readable media of claim 17, wherein the first KPI comprises a voice quality component and the second KPI comprises a data quality component and a voice quality component.

19. The one or more non-transitory computer readable media of claim 17, wherein the first KPI comprises a data quality component and the second KPI comprises a voice quality component and a data quality component.

20. The one or one or more non-transitory computer readable media of claim 17, further comprising communicating an anomaly alert to a network entity comprising an indication of the narrowed anomaly.

* * * * *

UNITED STATES PATENT AND TRADEMARK OFFICE
CERTIFICATE OF CORRECTION

PATENT NO. : 12,028,221 B2
APPLICATION NO. : 17/967673
DATED : July 2, 2024
INVENTOR(S) : Aditi Saluja, Raymond Weimin Wu and Vikas Ranjan It is certified that error appears in the above-identified patent and that said Letters Patent is hereby corrected as shown below:

In the Claims

Column 16, Claim 20, Line No. 21 (Approx.) in the line reading "The one or one or" should read
--The one or--

Signed and Sealed this
Twelfth Day of November, 2024

Katherine Kelly Vidal
*Director of the United States Patent and Trademark Office*